United States Patent [19]

Ohkawa et al.

[11] Patent Number: 4,770,572
[45] Date of Patent: Sep. 13, 1988

[54] PRESS FOR MANUFACTURING HELICAL GEARS

[75] Inventors: Kiyoyasu Ohkawa, Tokyo; Masao Murakawa, Saitama, both of Japan

[73] Assignee: Amino Iron Works Co., Ltd., Fujinomiya, Japan

[21] Appl. No.: 855,188

[22] Filed: Apr. 22, 1986

[30] Foreign Application Priority Data

Apr. 22, 1985 [JP] Japan .................................. 60-85680

[51] Int. Cl.$^4$ ........................ B23F 9/00; B23F 17/00; B23F 19/06
[52] U.S. Cl. ...................................... 409/60; 409/904; 409/282; 29/159.2
[58] Field of Search .................. 72/253.1, 262, 267; 29/159.2; 10/129 R; 407/14; 409/59, 60, 5, 58, DIG. 904, 2, 31, 282; 72/71, 72

[56] References Cited

U.S. PATENT DOCUMENTS

| | | | |
|---|---|---|---|
| 2,674,924 | 4/1954 | Nielsen | 409/60 |
| 2,767,438 | 10/1956 | Pingel | 425/78 |
| 2,940,159 | 6/1960 | Eklund | 409/59 |
| 3,394,432 | 7/1968 | Laurent | 425/78 |
| 3,492,917 | 2/1970 | Uber | 409/59 |
| 4,614,468 | 9/1986 | Waldrich et al. | 409/904 |

FOREIGN PATENT DOCUMENTS

| | | | |
|---|---|---|---|
| 3234771 | 3/1984 | Fed. Rep. of Germany | 29/159.2 |
| 76788 | 6/1977 | Japan | 29/159.2 |
| 181450 | 10/1983 | Japan | 29/159.2 |
| 1226889 | 3/1971 | United Kingdom | 29/159.2 |

Primary Examiner—Lowell A. Larson
Attorney, Agent, or Firm—Michael J. Striker

[57] ABSTRACT

A press for manufacturing helical gears having a punch with a cutting edge; a die with a cutting edge, one of the cutting edges being shaped as a helical gear and the other having a shape corresponding to the shape of the one cutting edge; and a bolster rotatable about an axis and provided with one of the die and the punch. The die and said punch are pressed together and the bolster is rotatably driven by a driving element in response to a lead of a helical gear to be manufactured. The stroke of the punch is detected and a desired rotation angle of a driving element is calculated and then signalled to the driving element.

17 Claims, 9 Drawing Sheets

FIG_1

FIG_6

FIG_7

FIG_9

FIG_8

FIG_10

FIG_23(a)

FIG_22

FIG_23(b)

FIG_23(c)

FIG_11

FIG_12

FIG_15

FIG_16

FIG_17

FIG_18

FIG_19

FIG_20

FIG_21

PRESS FOR MANUFACTURING HELICAL GEARS

BACKGROUND OF THE INVENTION

The present invention relates to a press for manufacturing helical gears.

When manufacturing helical gears, the prior art has in general machined blanks by means of a hob cutter or a pinion cutter, and added, as required, a post-process of a gear shaving or gear grinding. However, this is a pure machining process which forms gears by producing chips bit by bit, and therefore it has shortcomings of low efficiency and high production cost.

As an alternative to the gear machining process, a plastic working process has been practised for making gears. Typical examples are a cold and hot rolling process and a cold and hot forging process, which have good productivity and are advantageous in producing no chips but have drawbacks as mentioned below, and so are not always practical in a helical gear making process.

The rolling process requires an expensive machine, and since this process urges a material circumferentially thereof so as to swell it up, it is difficult to divide the circumference of the material into teeth of a determined number and it is not possible to create a tooth shape that has a large height. In addition, when manufacturing gears having axial holes, the hole is deformed by rolling pressure.

On the other hand, the forging process must effect plastic flow over the whole of gear material, so that the processing force is very large and a pressing machine must be scaled large accordingly so that a procedure must be carried out at a relatively high level to in order to design and produce a sample. Thus, the cost is high as a whole.

SUMMARY OF THE INVENTION

An object of the present invention is to solve problems as mentioned above by providing a press for manufacturing helical gears, which may easily make helical gears having an optional diameter of a pinch circle and angle of torsion by means of an upper die set and a lower die set, and simplifies molding at a low production cost.

For accomplishing this object, the invention performs nonlinear relative movement of a punch and a die at the side of the press body. A slide to be elevated by a press ram is furnished with a punch or die having a cutting edge shaped as a helical gear. A bed side is furnished with a rotational bolster around a vertical axial line, which bolster is furnished with a die or punch having a cutting edge shaped as a helical gear corresponding to said cutting edge of the punch or die, so that the rotational bolster is driven at rotation angle corresponding to lead of a gear to be manufactured and in match with the elevation of the slide.

DETAILED DESCRIPTION OF PREFERRED EMBODIMENTS

The present invention will be explained with reference to the embodiments shown in the attached drawings.

FIGS. 1 to 7 show one example of a press for manufacturing helical gears according to the invention, in which a reference numeral 65 designates a press frame, and a numeral 66 designates a slide housed in the press frame 65. The press frame 65 is connected with a press ram 69 at its upper side, and provided with slide bearings 68 at the both sides thereof, which contact a gib 67 furnished on the side of frame 65, so that they are guided at a high precision with zero clearance.

Figure 1:
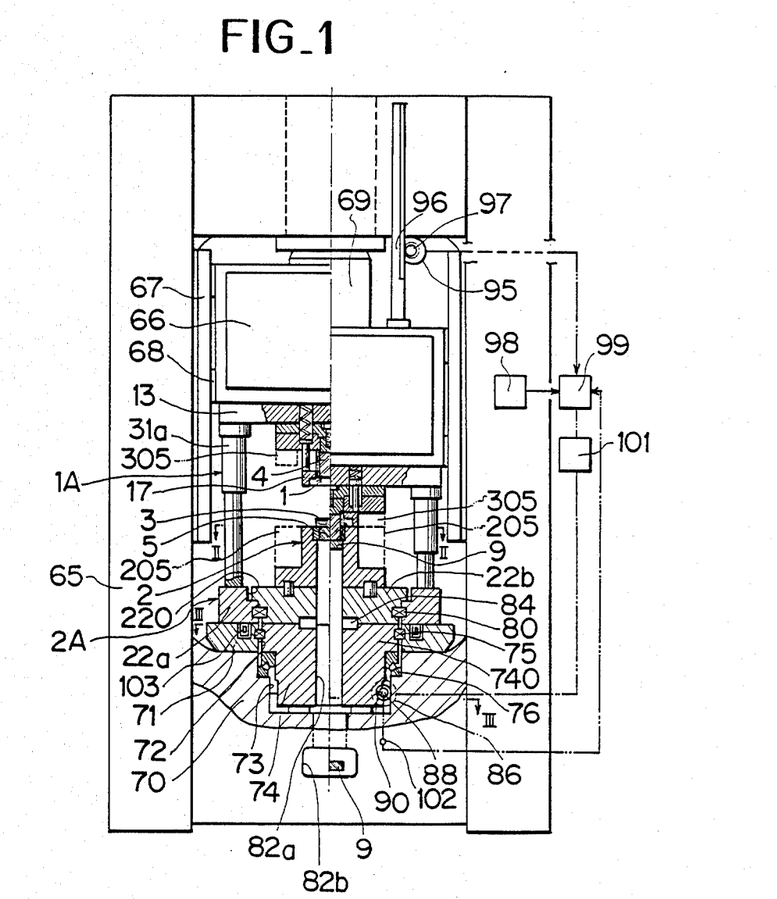
FIG. 1 is a front view showing one example of a press for manufacturing helical gears according to the invention.

A bed frame 70, on which a stationary bolster 71 is provided in opposition to the slide 66, has a frame shape having a hole 72 in an inner diameter side. The bed frame 70 is defined with a concave 73 concentrical with said hole 72, and a rotational bolster 74 is disposed over the hole 72 and the concave 73.

The rotational bolster 74 is so supported as to effect the rotation at high precision without causing vibration such as stick slip due to rotation resistance. The embodiment of FIG. 1 is a bearing system, in which a flange 740 is defined at an upper part of the side of the rotational bolster 74, and the circumference of the flange 740 is guided by a radial bearing 75 positioned in a hole of the stationary bolster 71 and is pivoted by a thrust bearing 76 disposed in the concave 73 at its lower surface.

Figures 2, 3, 4, 5:
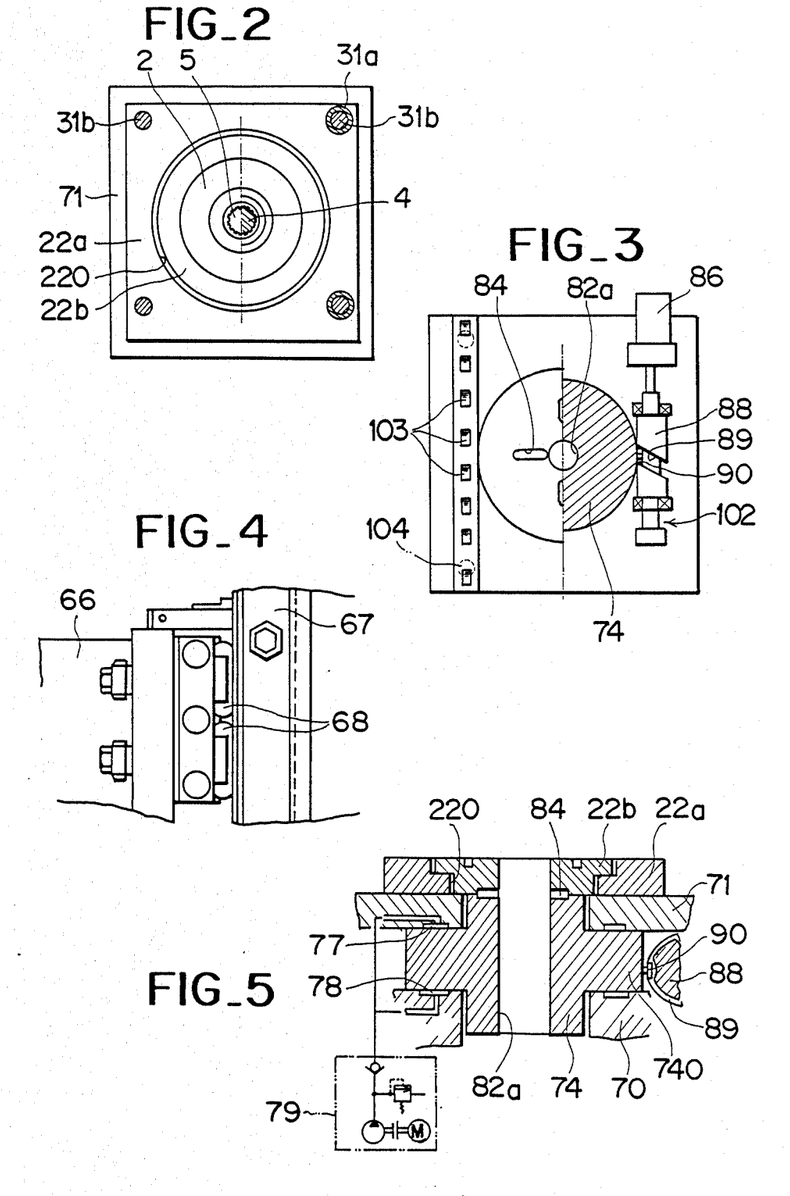
FIG. 2 is a cross sectional view along II—II of FIG. 1.
FIG. 3 is a cross sectional view along III—III of FIG. 1.
FIG. 4 is an enlarged view of a slide side shown in FIG. 1.
FIG. 5 is a cross sectional view showing another embodiment of a mechanism for supporting a rotational bolster.

FIG. 5 shows one example employing a hydrostatic pressure system (fluid lubricant system), in which the bed frame 70 and the stationary bolster 71 are defined with circular concaves 77, 78 in the upper and lower parts of the flange 740, which are communicated with an external fluid pressure unit 79. If a hydraulic or air pressure is guided into the concaves 77, 78, a pre-load is obtained and lubrication is effected thereby. FIG. 5 does not show a sealing material, but the sealing materials such as an O-ring may be arranged in the inner and outer directions of the circular concaves 77, 78 if required.

FIG. 1 shows an upper die set 1A secured under the slide 66 and having a die set plate 13 with guide bushes 31a at four corners. A lower die set 2A has a stationary die set plate 22a formed with a window 220 of circular shape in plain and a rotational die set plate 22b positioned in the window 220 via a thrust bearing 80.

The stationary die set plate 22a is implanted with guide posts 31b at the four corners for mounting in the guide bushes 31a. It is placed on the stationary bolster 71 at its lower surface, so that the plate 22a may be transferred outside of a press room or placed therein by means of die lifter rails 103 with rollers and sinking cylinders 104 in parallel grooves in the upper surface of the stationary bolster 71.

The rotational die set plate 22b is fixedly overlapped on the rotational bolster 74 which is rotated in a normal or reverse direction around a vertical axial line by a drive mechanism 85. This drive mechanism 85 may be any one so long as it does not cause backlash in the rotational bolster 74.

Figure 6:
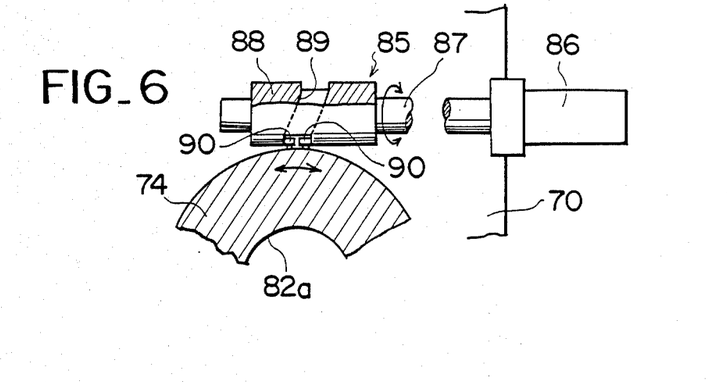
FIGS. 6 and 7 are front views showing one example of a drive mechanism of the rotational bolster.

FIG. 6 shows one embodiment provided on a servo motor 86 such as DC servo motor secured on a bed frame 70 and an output shaft 87, and comprises a tubular cam 88 precision-processed with a helical groove 89 of a length required for obtaining the maximum rotational angle on the outer circumference thereof, and two roller bearings 90 which are closely positioned for giving pre-load to the side wall of the helical groove 89, thereby to cause zero backlash.

Figure 7:
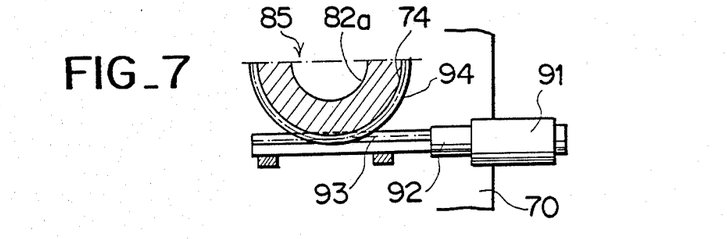

FIG. 7 shows another example which comprises a servocylinder secured to the bed frame 70, for example, an electric-hydraulic stepping cylinder 91, a rack 93 secured on a piston rod 92 and a pinion 94 formed on the outer circumference of the rotational bolster 74. The electric-hydraulic stepping motor 91 is, as known, composed of an electric stepping motor, a feed screw having a gear in mesh with a gear of the output shaft of the stepping motor, a piston rod having a female gear in mesh with the feed gear, and a cylinder casing encircling the outer circumference of the feed gear. A hydraulic switch valve is provided between a front chamber and a rear chamber of the piston rod within the cylinder casing, and a supply of oil is guided to the front chamber from the cylinder casing, and a return of oil is guided outside of the cylinder casing from the rear chamber via the switching valve, an oil path in the piston rod and a hole of the feed screw. The position of the piston is maintained by an equilibrium oil pressure between the front chamber and the rear chamber of the piston.

As other drive mechanisms 85 of the rotational bolster, a worm without backlash, a worm wheel and a servo motor may be associated.

The drive mechanism 85 synchronizes the die or punch mounted on the rotational bolster 74 with the linear movement of the punch or the die, and communicates with a control means to rotate it in response to the lead of a helical gear to be made.

This invention is characterized in that a helical gear with an optional diameter of the pitch circle and angle of torsion is manufactured by means of upper and lower dies. Herein, in FIG. 8, assuming that the diameter of the pitch circle of a helical gear to be produced is d1 and the angle of torsion is $\theta 1$, since d1 and $\theta 1$ are optional values, the lead L ($=\pi d1/\tan \theta 1$) must be selected variously. When various leads are obtained in the side of the metal mold, helical guides having corresponding helical angles must be processed in the metal guide.

Figure 8:
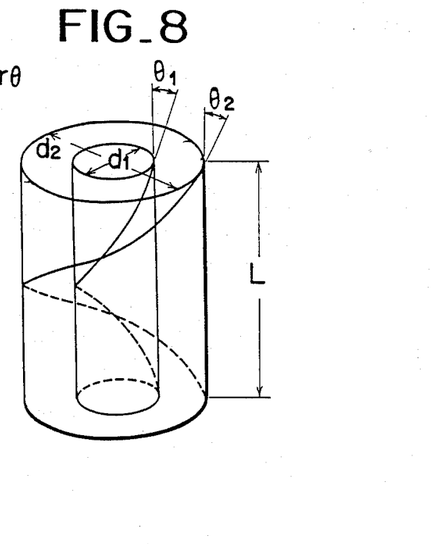
FIGS. 8 and 9 are explanatory views showing a principle of controlling the rotational bolster, lead and diameter of pitch circle.

On the other hand, in the invention, since the bolster fixed with the diameter d2 is rotatable, the correspondence of the bolster 74 may be effected at disposal only in that the bolster is rotated such that the helical lead is made equal to L of the lead value. $\theta 2$ is a rotational angle of the bolster, and in $\theta 1 < \theta 2$, $\theta 2 = \tan^{-1}(d2/d1 \tan \theta 2)$.

Figure 9:
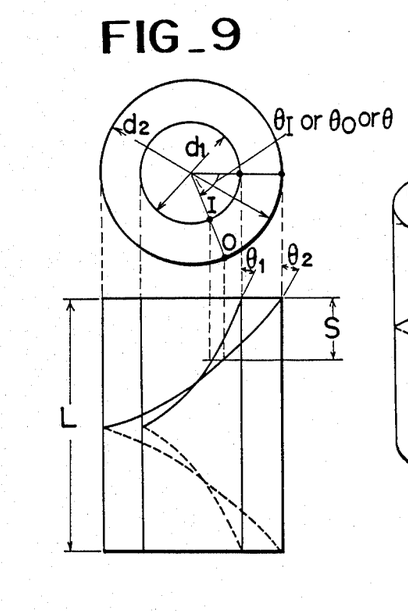

With respect to the control of the rotational bolster 74, when the descending speed of the press ram is constant, the speed $\omega$ of the rotational angle is controlled to be $\omega = 2\pi V0/L$ (rad/sec). But when the descending speed V0 of the press ram is not constant, assuming that a helical starting point corresponding to the stroke when the punch or the die descends by stroke S from a starting height is I with respect to the diameter d1 and O with respect to the diameter d2, it is as shown in FIG. 9, sufficient to control the rotational angle $\theta 0$, that is, the rotational angle $\theta$ of the rotational bolster with respect to the stroke S.

Figure 10:
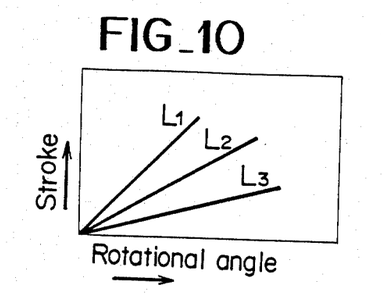
FIG. 10 is a graph showing relationship between rotational angle of a die, punch stroke and lead of a helical gear to be manufactured.

Actually, as shown in FIG. 10, a calculation is obtained from the stroke length of the slide and the rotational angle of the die. The drive mechanism is provided with a gear 97 in mesh with a screw shaft 96 secured to the slide 66, a detector 95 such as a rotary encoder or synchronizer which detects a position (length of stroke) of the slide 66 from the rotation amount of the gear and outputs it as an electric signal, a setter 98 which inputs the lead of a helical gear to be made, a calculator 99 which calculates the rotational angle of the rotational bolster from the signal of length of the detected stroke and the set lead, and a drive unit 101 which inputs a driving signal (e.g., an energizing pulse signal) corresponding to the signal of the rotational angle (series of pulses of normal rotation and series of pulses of reverse rotation) designated by the calculator 99 into an element part of the drive mechanism 85.

When the drive mechanism 85 is an association of the servo motor 86 and a tubular cam 88, the rotational bolster 74 is equipped with a detector 102 of rotational angle and a feed back circuit which feeds the signal of the rotational angle detector from the detector 102 to the calculator 99, and feeds an amending order to the drive mechanism 85 via the drive unit 101. When the drive mechanism 85 is an electric-hydraulic stepping cylinder, a feed back mechanism is composed by the piston rod, a switching valve spool and a feed screw, and an independent feed back means is not required.

With respect to the control of the start of the rotational bolster 74, the distance between the punch and the die depends upon position detection or setting of the detector 95, or touch switch. With respect to the control of finish of rotation, as shown in FIG. 1 with an imaginary line, the metal mold is provided with lower dead point stoppers, or as known the slide is provided with brackets at the both sides thereof, and the bed side is provided with a motor and left and right tuning screw shafts to be driven by said motor, and an adjust screw having screw holes to be screwed with the tuning screw shafts. The adjust screw may be positioned at a desired height by a position detector and contact to the bracket when the slide moves down. In either way, the movement of the detector is stopped by controlling the strike of the slide, thereby to stop an order of rotating the rotational bolster 74. The rotation speed of the bolster 74 is calculated by the sliding speed and the lead.

The processing manner by the upper die set 1A and the lower die set 2A is optional, and for example, as follows.

Figure 11:
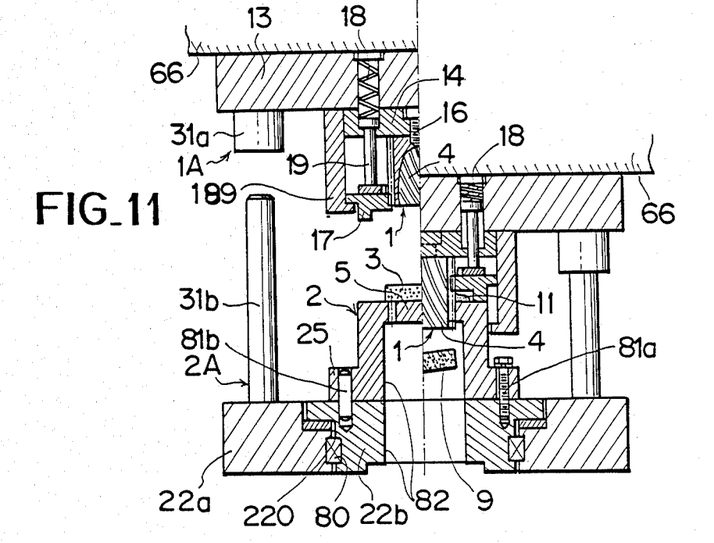
FIGS. 11 and 12 are cross sectional views showing the die set in an upper limit and a lower limit by half, respectively.

I. Punching of outer helical gear
II. Punching and shaving of outer helical gear
III. Punching and shaving of inner helical gear
IV. Simultaneous boring of axial hole
V. Precision punching of outer helical gear
VI. Precision punching of inner helical gear FIG. 11 shows the above process I, in which an upper die set 1A has a punch 1 defined with a cutting edge 4 shaped as a helical gear at the circumference thereof, and the punch 1 is integrally combined with a punch plate 14 by a bolt 16, and the punch plate 14 is fixed to a die set plate 13 by a bolt (not shown), and the die set plate 13 is fixed to the slide 66. At the outer circumference of the punch 1, a stripper 17 having an inner gear shape in mesh with the cutting edge 4 is supported by a pin 19, a spring 18 pressing the pin 19 from the rear side, and a stripper holder 189 encircling the outer circumference.

A rotational die set plate 22b is disposed with a die 2 having a flange 25 and is secured by a positioning pin 81b concentrically with the punch 1. Within the die 2, a cutting edge 5 of helical shape is provided such that the cutting edge 4 of the punch 1 is inserted with uniform clearance over the outer circumferential direction.

Figure 12:
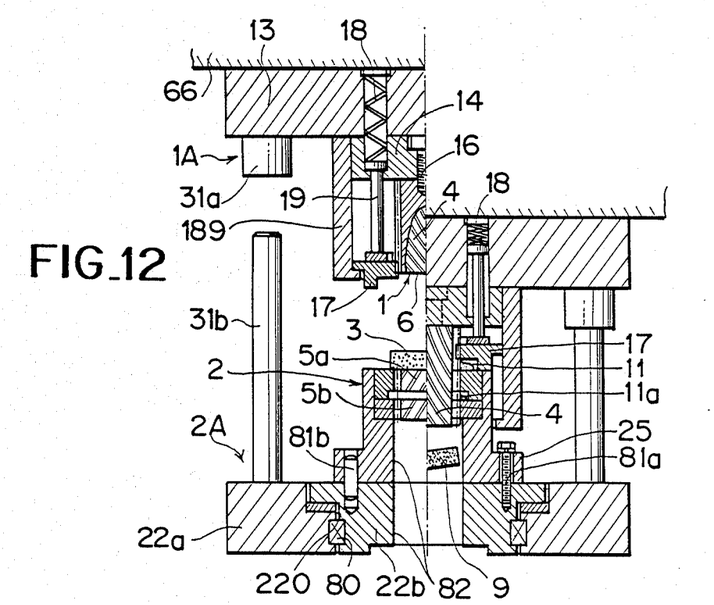

FIG. 12 shows the process II, in which the punching and the shaving of the helical gear are performed with the same stroke, and a cutting edge 5a of helical shape for punching is fixed within the die 2, whereby a cutting edge 5b shaped in helical gear is disposed whose clearance with the cutting edge 4 of the punch 1 is made smaller than the cutting edge 5a.

The die 2 and the rotational die set plate 22b are formed with a punch dropping hole 82 concentrically, and the rotational bolster 74 is formed with a lower punch dropping hole 82a concentrically with the punch dropping hole 82, and a bed frame 70 is opened with chute hole 82b.

The cutting edges 5, 5a, 5b of the die 2 must be exactly geared with the cutting edge 4 of the punch 1 at the start of the process, and for positioning of gearing. Overlapping parts of the rotational die set plate 22b and the rotational bolster 74 are arranged with a positioning member 84 as a pin cotter in order so as not to cause rattling or clearance.

Figures 13, 14:
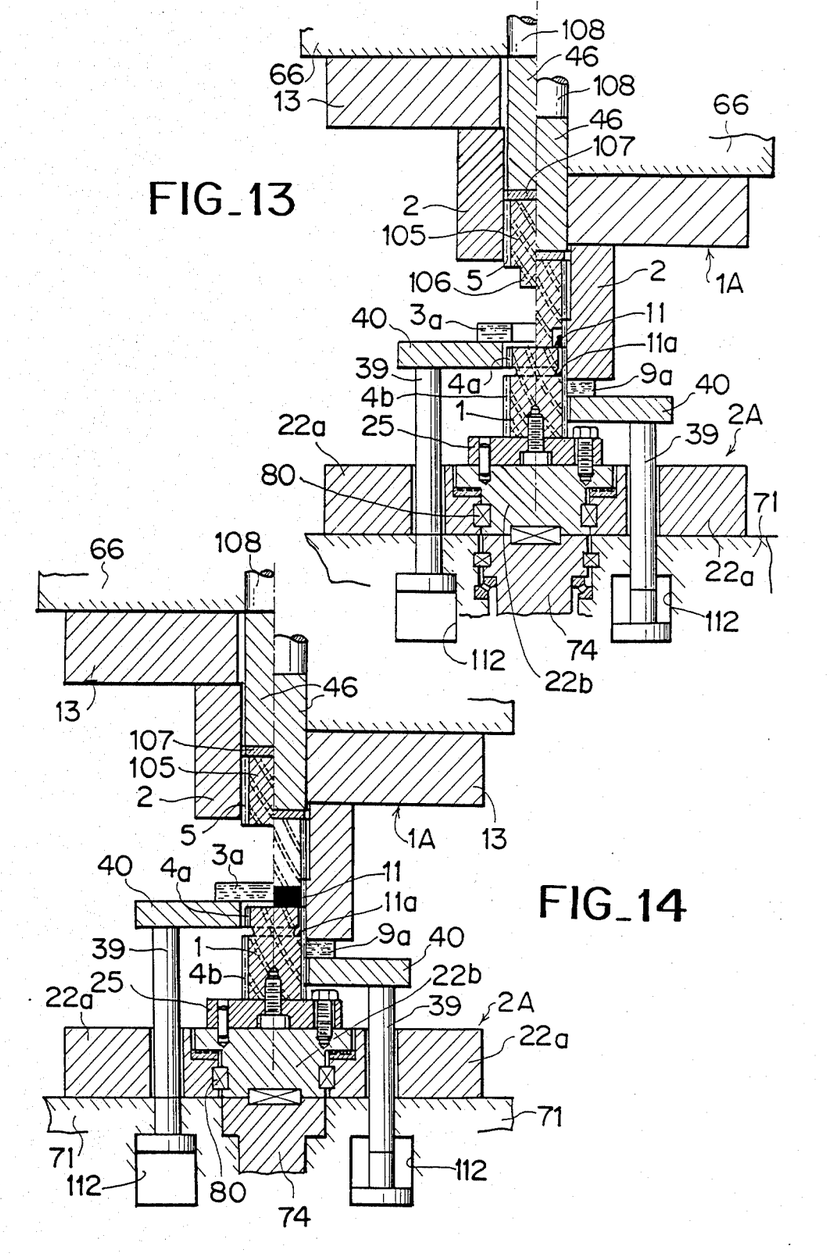
FIGS. 13 and 14 are cross sectional views showing molds for processing inner gears in an upper limit and a lower limit by half, respectively.

FIGS. 13 and 14 show the process III, in which the punch 1 and die 2 are positioned in reverse from that of the previous processing molds, and the punch is provided to the side of the rotational bolster and the die 2 is provided to the side of the slide.

FIG. 13 shows an embodiment for processing a material 3a having a lower hole. The die 2 has a helical shaped cutting edge secured on the lower surface of the slide 66 by the die set plate 13. The die 2 is formed with a hole 82 corresponding to the punch dropping hole, into which a knock-out punch 105 having a projection 106 is inserted by a thrust bearing 107, and the hydrostatic pressure acts by a pressure source 108 from the rear side of the thrust bearing 107. The pressure source may be a spring, such as a hydraulic cylinder housed in the slide 66. The pressure bar 46 is connected to the slide bearing 107.

The punch 1 is furnished on a rotational die set plate 22b by the flange 25, and the outer circumference thereof is stepped with a cutting edge 4a for punching and a cutting edge 4b or shaving at the rear side of the stroke than the former.

The stationary die set plate 22a is projected with a plurality of connecting bars 39 passing through the plate 22a and secured with a pressure plate 40 of ring shape at its upper end, and acted with a hydrostatic pressure at its lower end from the pressure source 112.

FIG. 14 shows a processing mold for a solid material 3 which has the same structure as in FIG. 13 excluding that the knock-out punch 105 is provided with the projection 106.

Figure 15:
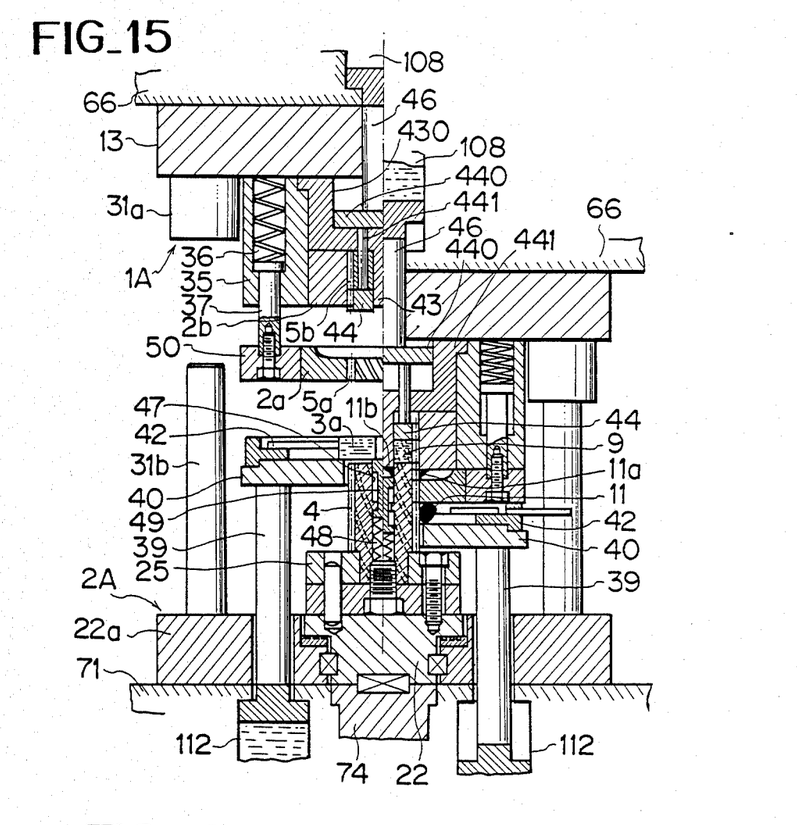
FIG. 15 is a cross sectional view showing an embodiment for processing an axial hole simultaneously.
Figures 16, 17:
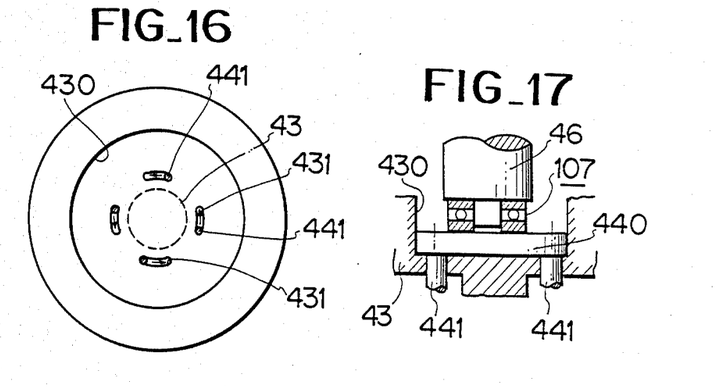
FIG. 16 is a plan view of a punch for processing the axial hole.
FIG. 17 shows in detail a thrust bearing.

FIGS. 15 and 16 show the process IV, in which with respect to the upper mold, an upper die set 13 is fixed with a circular guide holder 35, and a punching die 2a is fixed under the holder 35 via a holder frame 50 biased by a spring 36 and a guide pin 37, and further a shaving die 2b is fixed at an inner circumference of the guide holder at a rear side of stroke of said punching die 2a. The punching die 2a and the shaving die 2b are furnished with cutting edges 5a, 5b of helical gear shape, respectively.

With respect to the lower mold, a stripper plate 40 is fixed to a die cushion (connecting bar) 39 on its upper end passing through a stationary die set plate 22a. A punch 1 is defined with a cutting edge 4 shaped in helical gear and is fixed to a rotary die set plate 22b by a flange 25. The punch 1 extends along the inner side of the stripper plate 40 which is stepped with a positioning means 42 comprising three pawls. For an axial processing mechanism, an axial hole processing punch 43 is secured at the inner side of the shaving die 2b of the upper mold and with a space in relation to the cutting edge 5b, and a gear knock-out 44 is provided at the outer circumference of said punch 43.

The gear knock-out 44 is supported by a plate 440 and a bar 441 fixed to the plate 440 at its rear end. Said plate 440 is connected to a knock-out bar (pressure bar) 46 extending from the pressure source 108, and is vertically moved along a concave 430 of the axial hole processing punch 43 which is, as shown in FIG. 16, formed with arc-shaped holes 431 for allowing rotation of bars 441. It is preferable to position a thrust bearing 107 as shown in FIG. 17 between the knock-out bar 46 and the plate 440 for effecting smooth contact.

The punch 1 is provided with an axial hole processing die part 47 in opposition to said axial hole processing punch 43. The axial hole processing die part 47 is inserted with a stopper for hole, i.e., a knock-out 49 vertically moving via the spring 48. The axial hole processing punch 43 is for shaving, and may be made serve as the punch or may be provided with a shaving punch at the rear side of the stroke.

Figure 18:
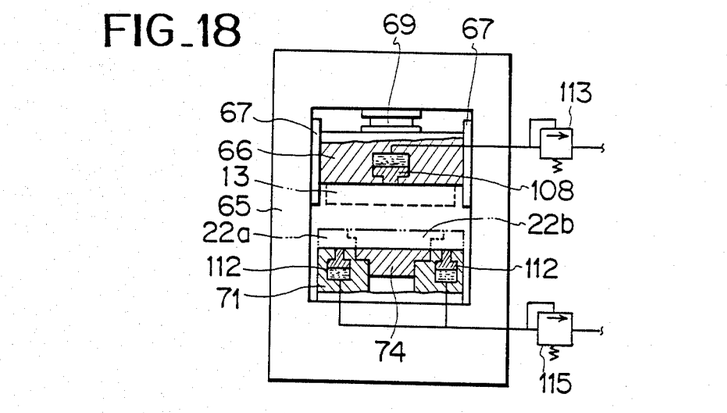
FIG. 18 is a front view showing a press of the invention having a pressure source for giving hydrostatic pressure.
Figure 19:
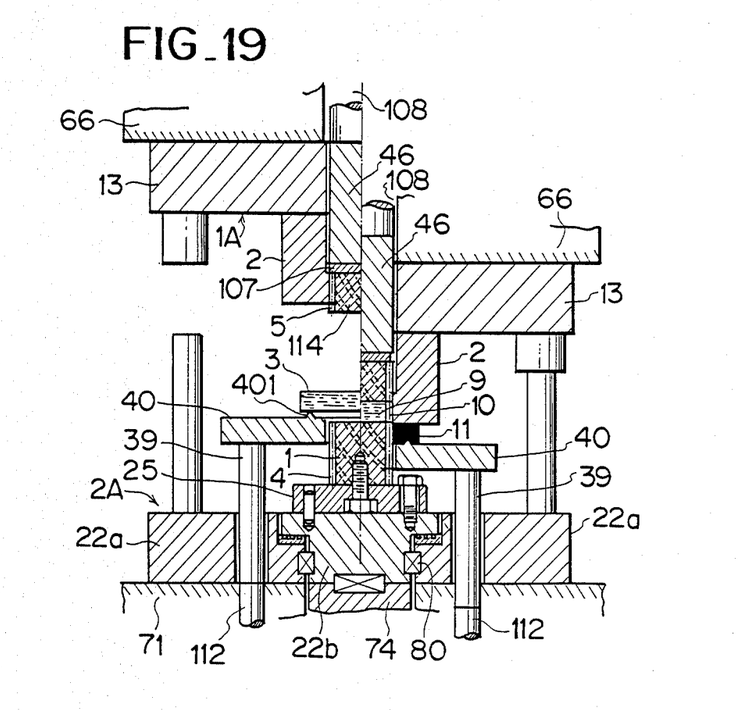
FIGS. 19 to 21 are cross sectional views showing a die of precision punching.

FIGS. 18 to 20 shows the process V, and FIG. 18 shows a press mechanism suitable to this process and those of FIGS. 13 to 15, which is centrally housed with a hydraulic pressure cylinder as a pressure source 108 for obtaining a required pressure by a relief valve 113. In FIGS. 13 and 14, the piston rod of the pressure source 108 or a pressure bar 46 connected to this source moves the knock-out punch 105, and in FIG. 15 it moves the axial hole processing punch 43, and in FIG. 19 it moves a checking pressure plate 114.

The stationary bolster 71 is housed with hydraulic cylinders 112, 112 as the pressure source for obtaining a hydrostatic pressure by a relief valve 115. In FIGS. 13 and 14, and FIGS. 19 to 21, a pressure plate 40 is biased by the connecting bar 39, and in FIG. 15, the stripper plate 40 is biased by the same so as to give enough the hydrostatic pressure to cutting edges 5, 5a.

When the structure shown in FIG. 18 is employed for performing a precision punching, the press per se can give the checking pressure and the pressing plate indispensable to this process, so that the structure of the mold may be simplified.

In FIG. 19, the die 2 is fixed to the side of the slide 66, while the punch 1 is fixed to the die set plate 22b. The pressing plate 40 is formed with a projection of ring shape in plan or following a configuration of a product. Others follow FIGS. 13 and 14 with the same reference numerals.

Figure 20:
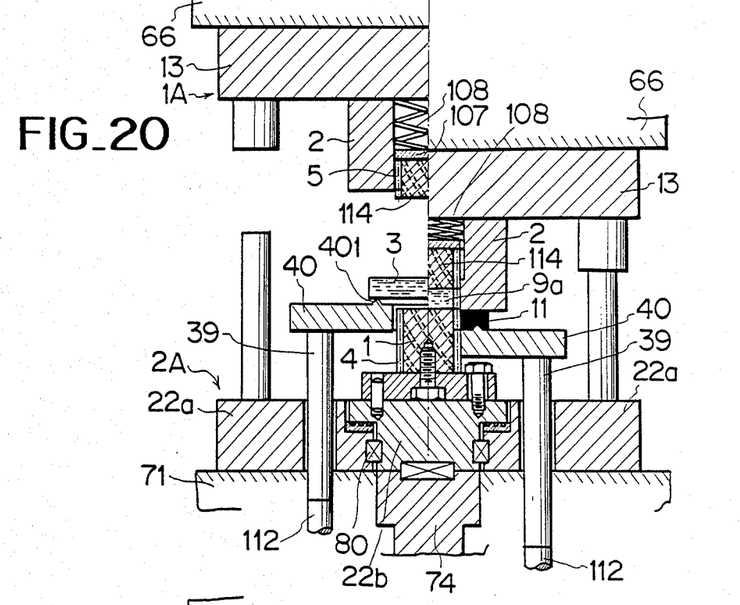

FIG. 20 shows an embodiment which employs a spring as the pressure source 108, and others are the same of FIG. 19.

Figure 21:
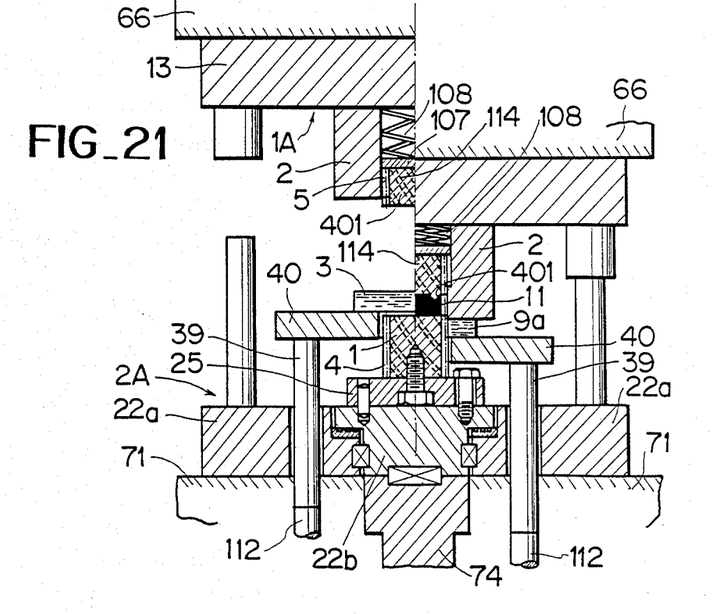

FIG. 21 shows the process VI, in which the checking pressure plate 114 is formed with a projection 401. As mentioned, the pressure source may be of course the hydraulic cylinder. In the embodiment of FIG. 19, it is possible to produce the inner helical gear by forming the projection 401 in the pressing plate 114 and not forming it in the pressing plate 40.

Figure 22:
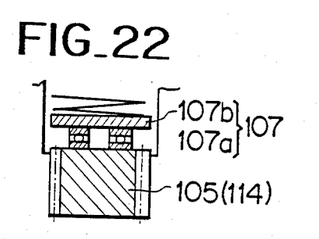
FIG. 22 is a cross sectional view showing in detail the thrust bearing of FIGS. 13 and 14, and FIGS. 19 to 21; and, FIGS. 23(a) to 23(c) are explanatory views showing the manufacturing processes of the helical gear by the embodiments of FIGS. 11 and 12.

FIG. 22 shows in detail the thrust bearing 107 of FIGS. 13 and 14, and FIGS. 19 to 21, comprising a bearing body 107a and a thrust washer 107b.

A further explanation will be made to operation of the press with reference to FIGS. 11 and 12. For manufacturing the helical gears, the lower die 2A is mounted on the rotational bolster 74, while the upper die set 1A is secured to the slide 66. The upper and lower dies 1A, 2A are centered with respect to each other by the guide bush 31a and the guide post 31b, and the cutting edges 5, 5a, 5b of the die 2 are automatically met with the cutting edge 4 of the punch 1 in the starting point by means of the positioning means 84. On the other hand, the lead of the helical gear to be made is input into the setter 98 of the control means.

The material 3 is placed on the die 2 under the above mentioned condition and the centering is done by an appropriate manner, and then a main cylinder 69 is operated to move down the slide 66 at the upper dead point. Since the slide 66 is guided along the side of the frame with zero clearance by the slide bearing 68, the punch is moved down at high precision. The detector 95 starts detection of the length of the punch stroke at the same time when the slide 66 moves down, and the detecting signal is input to the calculator 99.

In the calculator 99, the initiation of rotation and the necessary rotational angles L1, L2, L3 are calculated from the preset lead and the detecting signal of the stroke length, and a responsive signal is sent to the drive unit 101. A driving signal is input in a drive mechanism 85 from the drive unit 101 for operating the drive mechanism 85.

If the drive mechanism 85 is the servo motor 86 and a tubular cam 88, the tubular cam 88 is rotated by the driving of the servo motor 86, and since the roller bearing 90 follows a helical groove 98 defined in the cam 89, the rotational bolster 74 begins rotation without backlash. In this case, the rotating direction of the rotational bolster 74 depends upon the rotation of the servo motor 86, and the rotation speed is in proportion to the rotation speed of the servo motor 86. If the drive mechanism is rack pinions 93, 94 and an electric-hydraulic stepping motor 91, the stepping motor 91 outputs rotation angle in response to the pulse number at speed in proportion to the pulse frequency number, so that the feed screw moves linearly the switching valve spool by an amount in response to the rotation angle, and the oil flows under pressure from the front chamber of the piston rod to the rear chamber, and vise versa. The piston rod 92 is moved thereby, and since the rack 93 furnished therein rotates the pinion 94, the rotational bolster 74 carrying the pinion 94 is rotated accordingly. In this case, the rotating direction of the rotational bolster 74, that is, the moving direction of the piston rod 92 depends upon the rotating direction of the electric stepping motor 91, and the moving speed is in proportion to the frequency number of the input pulse (rotation speed of the electric stepping motor).

The rotational bolster 74 is reduced in resistance by the bearing or the hydrostatic pressure mechanism within the bed frame, and is rotated in synchronism with descending of the slide 66 by a determined rotating angle without causing the backlash, by means of the driving mechanism and the control means. Therefore, the rotational die set plate 22b mounted on the rotational bolster 74 and the die 2 on the plate 22b are rotated at high precision in synchronism with descending of the punch 1 fixed to the slide 66.

Figure 23A:
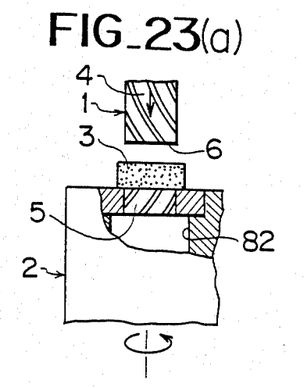
Figure 23B:
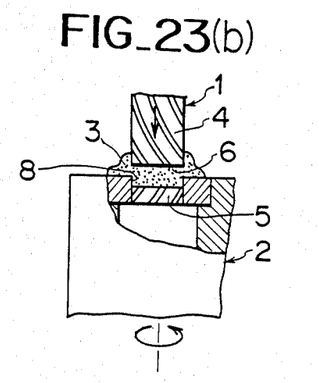
Figure 23C:
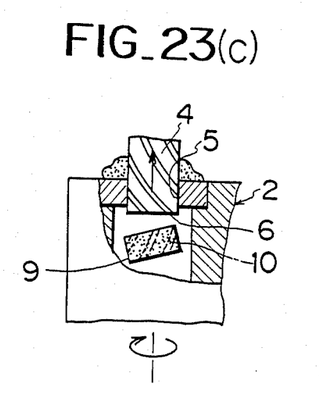

FIGS. 23a to 23c show the manufacturing processes. When the punch 6 contacts and urges the material 3 toward the die, the cutting edges 4, 5 shaped in the helical gear are caused with relative helical movement, and the material 3 is sheared in obliquity at the circumference by the cutting edge 5. The cutting edges 4, 5 are exactly controlled in the relative position by said control means, and the material 3 is effected with the plastic flow somewhat expanding in radius in accompany with increase of the amount urged into the die 2, and a helical gear 8 is, as shown in FIG. 23b, formed partially and gradually by subsequent helical movement of the cutting edge. The stripper 17 moves down together with the punch 1, and when it contacts the upper surface of the die 2, it is guided by the cutting edge of the punch and the stripper holder 189, and moved upward along the punch 1 as rotating.

When the end face 6 of the punch 1 comes to a level corresponding to an entrance of the cutting edge 5 of the die 2, the material 3 is perfectly punched out and turns out a product 9 having a helical gear shape 10 of the desired lead obtained in relation between the rotational angle and the stroke.

While the cutting edge 4 of the punch 1 descends in mesh with the cutting edge 5 of the die 2, the product 9 drops into the punch-dropping hole 82 as shown in FIG. 11, and is taken out outside of the bed frame through the lower dropping hole 82a in center of the rotational bolster and the chute hole 82b.

When the slide reaches the lower dead point, the rotational bolster 74 stops, and the slide 66 begins to move upward by the main cylinder 69, and then the detector 95 detect the length of the stroke, and the drive mechanism 85 is operated via the calculator 99 and the drive unit 101, and the rotational bolster 74 rotates at a determined angle in a reverse direction of the processing period. The cutting edges 4, 5 of the die 2 and the punch 1 make the synchronizing relative helical movement, and the punch 1 slips out from the die 2. When the punch 1 comes to the upper dead point, one stroke of the process is finished.

If the structure of FIG. 12 is used as the die set, the die 2 is rotated by the rotational bolster 74, so that the cutting edges 5a, 5b of two steps are rotated and the relative helical movement is effected in relation with the punch 1. The material 3 is processed into a helical gear by the upper cutting edge 5a and the cutting edge 4 of the punch 1, and subsequently the a part of a helical gear is subjected to the shaving by the lower cutting edge 5b. Thus, the helical gear is produced at high precision.

Scraps 11 staying on the outer circumference of the punch are stored as strippings on the die 2 by a stripper 17 due to reaction force of the spring 18, and shaved dusts 11a are stored as strippings on the cutting edge 5b by the cutting edge 5a. Those scraps are instantly exhausted by the air from the front part to the rear part of the mold.

With respect to the process of the inner helical gears by the mold shown in FIGS. 13 and 14, the material 3a or 3 is set on the pressing plate 40. The embodiment of FIG. 13 uses the material 3 which has been in advance pre-processed with an inner hole which preferably is made larger in the inner diameter than the circular diameter of the inner gear product, so that scrap dusts do not stick to the end of the gear and burrs may be reduced. When the slide 66 moves down the rotational bolster 74 and the rotational die set plate 22b begin rotation as the same time, and when the die 2 contacts the material 3 or 3a, the inner gear is at first punched by the cutting edge 4a of the punch 1 and the cutting edge 5 of the die 2, and subsequently the shaving is carried out by the cutting edge 4b of the punch 1 and the cutting edge 5 of the die 2. Thus, the processing is finished.

The pressure bar 46 and the connecting bar 39 are pressed by the pressure sources 108, 112 at the same time of the slide 66 moving upward. The inner helical gear 9a is upheaved on the punch by the pressing plate 40, and punched dusts 11 are exhausted on the upper part of the punch by the knock-out punch 105. After obtaining the product, the punched dusts 11 and the shaved dusts 11a are exhausted by the air or other means.

The pressing plate 40 of FIGS. 13 and 14 serve as a stripper, and the knock-out punch 105 is used only for exhausting the punched dusts. The pressure of the pressure source 108 is controlled at the minimum. Since the knock-out punch 105 of FIG. 14 also serves the pressing plate, the pressure of the pressure source 108 may be used up to the upper limit.

With respect to the processing mold of FIG. 15, the pressure sources 108, 112 are set at the determined level, and after the piston rod is moved as shown at the left side of FIG. 15, the material 3a is sent on the punch 1 by the positioning means 42 on the pressing plate 40, and the rotational die set plate 22b and the punch are rotated at the determined speed in synchronism with the descending of the slide 66, so that the punching is performed by the punching die 2a and the punch 1.

Under the condition that the product is positioned by the punching die 2a, the shaving process is begun by the shaving die 2b, and the finished process is undertaken on the gear part by means of the shaving die 2b and on the axial hole by means of the axial hole shaving die 47 positioned centrally of the axial hole processing punch 43 and the punch 1.

When the processing is finished and the dies 2a and 2b move upward, the punch 1 starts rotation in a reverse direction of the processing period. The punched dusts are exhausted by the pressure source 112 of the stationary bolster 71 onto the punch 1, and the shaved dusts of the axial hole are exhausted thereonto by the stripper pin 49 via the spring 48. The shaved dusts 11a of the helical shape are stored as strippings by the die 2a on the shaving die 2b.

The processed product 9 is knocked out on the punching die 2a due to the helical shape of the knockout plate 44 via the pressure bar 46 by the pressure source 108 provided in the slide 66, and is exhausted together with the scraps outside of the mold. In the processing mold shown in FIGS. 19 and 20, a determined plate pressure is set by the pressing plate 40 mounted on the connecting bar 39 and the material 3 is set concentrically on the punch 1 and the pressing plate 40.

The upper die set 1A having the die 2 and the checking pressure 14 moves down by the descending of the slide 66, and the checking pressure 114 contacts the material 3 and gives checking force thereto by the pressure from the pressure source 108. The projection 401 of the pressing plate 40 is pressed into the material 3 so as to heighten the hydrostatic pressure at the shearing part.

The punch 1 is rotated together with the rotational die set plate 22b by the rotation of the rotational bolster 74 under the condition that the determined hydrostatic pressure is given, whereby the precision punching of the helical gear is undertaken by the punch 1 and the die 2.

When the processing is finished, the outer helical gear 9 is sent as strippings downward of the die by the checking pressure 114, and the punched dusts 11 on the outer circumference of the punch are stored as strippings on the upper part of the punch by the reaction force given to the pressing plate 40. In the processing mold of FIG. 21, the plate pressure is effected by the projection 401 formed on the checking pressure 114 and the precision punching of the inner helical gear is performed, and the others are the same as previously described.

Each of the above mentioned processes may be applied to all of the hot, warm and cold workings, and materials may be selected from metallic materials or non-metallic material as plastics.

In accordance with the present invention, in order to provide the relative helical movement between the punch defined with the cutting edge shaped in helical gear and the die deformed at the inner circumference thereof with the cutting edge to be geared with said cutting edge, the slide is secured with the punch or the die, and the bed is arranged with the rotational bolster having the die or the punch. Since the rotational bolster is to be rotated around the vertical and axial line, it is possible to easily and variously manufacture the helical gears of various angles of torsion and the pitch circular diameters by means of one die set at low cost.

We claim:

1. A press for manufacturing helical gears comprising:
   a punch (1) with a helically shaped cutting edge (4);
   a die (2) with a helically shaped cutting edge (5, 5a, 5b) corresponding to said cutting edge (4) of said punch (1);

a rotatable bolster (74) rotatable about an axis and provided with one of said die (2) and said punch (1);

means (69) for linearly moving one of said punch (1) and said die (2) relative to the other of said punch (1) and said die (2) so as to effect linear movement, said linearly moving means being formed to press said punch and said die together;

means (85, 86, 88) for rotatably driving said bolster (74) in response to a lead of a helical gear to be manufactured and in synchronism with said linear movement of said one of said punch (1) and said die (2);

a frame (70) supporting said rotatable bolster (74); and means for supporting said rotatable bolster (74) on said frame (70) and including bearings (75, 76), said driving means including a servo motor (85).

2. The press as defined in claim 1, further comprising: a slide vertically movable and secured to said punch, said means for linearly moving said punch relative to said die being formed to vertically move said slide and including a press ram, said punch and said die and said bolster being aligned vertically relative to each other.

3. The press as defined in claim 2, further comprising: means for guiding said slide with zero clearance.

4. The press as defined in claim 1; further comprising: an upper die set (1A) and a lower die set (2A), said lower die set having a stationary die set plate (22a) and having a rotatable die set plate (22b) rotatably held by said stationary die set plate (22a), said rotatable die set plate (22b) being fixedly overlapped on said rotatable bolster (74), said upper die set (1A) having an upper die set plate (13) fixed to one of said punch (1) and said die (2), said rotatable die set plate (22b) being fixed to the other of said punch (1) and said die (2); and a stationary bolster (71), said rotatable bolster (74) being fitted within said stationary bolster (71), said stationary bolster (71) being fixed to said stationary die set plate (22a).

5. The press as defined in claim 1, wherein said punch follows a path to press against said die in a stroke; further comprising:

a shaving edge spaced from said cutting edge of said punch and being movable in association therewith so as to follow behind said cutting edge of said punch along said path during said stroke.

6. The press as defined in claim 1, wherein said linearly moving means includes a first pressure checking plate (114) and a first pressure source (108) for providing a pressure to said first pressure checking plate (114) so that said punch (1) moves linearly relative to said die (2); and further comprising:

means (39, 40) for cushioning said linearly moving means and including a second pressure plate (40) opposing said first pressure checking plate (114) and a second pressure source (112) for providing a pressure to said second pressure plate (40).

7. The press as defined in claim 6, further comprising: an upper die set (1A) accommodating one of said die (2) and said punch (1) and fixed to said first pressure checking plate (114).

8. The press as defined in claim 6, wherein said first pressure source is formed for knocking-out the manufactured helical gear.

9. The press as defined in claim 6, wherein said second pressure source is formed for removing any strippings of excess material from the manufactured helical gear.

10. The press as defined in claim 1; and further comprising:

an upper die set (1A) and a lower die set (1B), said lower die set (1B) having a stationary die set plate (22a) and having a rotatable die set plate (22b) rotatably held by said stationary die set plate (22a), said rotatable die set plate (22b) being fixably overlapped on said rotational bolster (74), said upper die set (1A) having an upper die set plate fixed to one of said punch (1) and said die (2), said rotatable die set plate (23b) being fixed to the other of said punch and said die;

a stationary bolster (71), said rotatable bolster (74) being fitted within said stationary bolster (71), said stationary bolster (71) being fixed to said stationary die set plate (22a); and a slide (66) secured to said punch (1), said means for linearly moving said punch including a press ram, said punch and said die and said rotatable bolster being aligned linearly with each other, said linearly moving means being formed to move said slide (66) and thereby said punch (1) so that said punch (1) presses against said die (2).

11. The press as defined in claim 1, wherein said frame (70) supporting said rotatable bolster is a bed frame (70); and further comprising:

a press frame (65) having a lower side and an upper side, said bed frame (70) being fixed at said lower side;

a slide (66), said linearly moving means being formed to move said slide (66) linearly relative to said upper side of said press frame (65) to effect said linear movement and including a press ram (69);

a stationary bolster (71) fixed on said bed frame (70);

a rotatable bolster (74) fitted within said stationary bolster (71), said rotatable bolster (74) having a lower portion, said bed frame (70) having a hole formed therein, said lower portion of said rotatable bolster (74) being rotatably supported in said hole;

an upper die set (1A) fixed to said slide (66);

a lower die set (2A) having a rotatable die set part (22b) and a stationary die set part (22a) rotatably holding said rotatable die set part (22b), said stationary die set part (22a) being fixed to said stationary bolster (71), said rotatable die set part (22b) being fixedly overlapped on said rotatable bolster (74), said cutting edges (4,5) being arranged relative to each other so that said cutting edges (4,5) are movable next to each other with a uniform clearance so as to telescope to effect a cutting operation, one of said punch (1) and said die (2) being fixed on said upper die set (1A), the other of said punch (1) and said die (2) being fixed on said rotatable die set part (22b), said driving means (85) being actuatable and formed for alternatively rotating said rotatable bolster (74) in one direction and a direction reverse to that of said one direction; and means for controlling an actuation of said driving means (85) in response to a lead of a helical gear to be manufactured in synchronism with said linear movement of said slide (66).

12. A press for manufacturing helical gears comprising:

a punch (1) with a helically shaped cutting edge (4);

a die (2) with a helically shaped cutting edge (5, 5a, 5b) corresponding to said cutting edge (4) of said punch (1);

a rotatable bolster (74) rotatable about an axis and provided with one of said die (2) and said punch (1);

means (69) for linearly moving one of said punch (1) and said die (2) relative to the other of said punch (1) and said die (2) so as to effect linear movement, said linearly moving means being formed to press said punch and said die together;

means (85, 86, 88) for rotatably driving said bolster (74) in response to a lead of a helical gear to be manufactured and in synchronism with said linear movement of said one of said punch (1) and said die (2);

a frame (70) supporting said rotatable bolster (74); and means for supporting said rotatable bolster (74) on said frame (70) and including a hydrostatic pressure mechanism, said driving means including a servo motor (85).

13. A press for manufacturing helical gears, comprising:

a punch (1) with a helically shaped cutting edge (4);

a die (2) with a helically shaped cutting edge (5, 5a, 5b) corresponding to said cutting edge (4) of said punch (1);

a rotatable bolster (74) rotatable about an axis and provided with one of said die (2) and said punch (1);

means (69) for linearly moving said punch (1) relative to said die (2) so as to effect linear movement, said linearly moving means being formed to press said punch and said die together; and means (85, 86, 88) for rotatably driving said bolster (74) in response to a lead of a helical gear to be manufactured and in synchronism with said linear movement of said punch (1), said driving means including a servo cylinder-piston unit.

14. A press for manufacturing helical gears, comprising:

a punch (1) with a helically shaped cutting edge (4);

a die (2) with a helically shaped cutting edge (5, 5a, 5b) corresponding to said cutting edge (4) of said punch (1);

a rotatable bolster (74) rotatable about an axis and provided with one of said die (2) and said punch (1);

means (69) for linearly moving said punch (1) relative to said die (2) so as to effect linear movement, said linearly moving means being formed to press said punch and said die together; and means for rotatably driving said bolster (74) in response to a lead of a helical gear to be manufactured and in synchronism with said linear movement of said punch (1), said driving means including an electric-hydraulic stepping cylinder-piston unit.

15. A press for manufacturing helical gears comprising:

a punch with a helically shaped cutting edge;

a die with a helically shaped cutting edge corresponding to said cutting edge of said punch;

a rotatable bolster rotatable about an axis and provided with one of said die and said punch;

means for linearly moving said punch relative to said die so as to effect linear movement, said linearly moving means being formed to press said punch and said die together;

means for rotatably driving said bolster in response to a lead of a helical gear to be manufactured and in synchronism with said linear movement of said punch;

a slide vertically movable and secured to said punch, said means for linearly moving said punch relative to said die being formed to vertically move said slide and including a press ram, said punch and said die and said bolster being aligned vertically relative to each other, said slide being movable in a stroke, said driving means including a rotatable driving member;

means for detecting said stroke of said slide;

means for calculating a desired rotation angle of said rotatable driving member in response to the lead of the helical gear to be manufactured and in response to said stroke as detected by said detecting means; and means for controlling said rotatable driving member in correspondence with said desired rotation angle as calculated by said calculating means.

16. The press as defined in claim 15, wherein said rotatable driving member includes a servo motor, said calculating means calculating a rotation angle for said servo motor.

17. The press as defined in claim 15, wherein said rotatable driving member includes a servo cylinder-piston unit, said calculating means calculating a rotation angle for said servo cylinder-piston unit.

* * * * *